(12) United States Patent
Bernstrom

(10) Patent No.: US 6,412,313 B1
(45) Date of Patent: *Jul. 2, 2002

(54) TRAILER SECURITY DEVICE

(76) Inventor: John C. Bernstrom, 4919 Pierce Park La., Boise, ID (US) 83703

( * ) Notice: Subject to any disclaimer, the term of this patent is extended or adjusted under 35 U.S.C. 154(b) by 0 days.

This patent is subject to a terminal disclaimer.

(21) Appl. No.: 09/552,442

(22) Filed: Apr. 18, 2000

Related U.S. Application Data

(63) Continuation-in-part of application No. 09/228,543, filed on Jan. 4, 1999.

(51) Int. Cl.[7] .......................... E05B 73/00; E05B 69/00
(52) U.S. Cl. ................................ 70/14; 70/58; 70/232; 70/258; 280/507
(58) Field of Search .......................... 70/14, 18, 19, 70/58, 158, 163, 164, 166–169, 258, 178, 232; 280/507, 511; 180/9.4

(56) References Cited

U.S. PATENT DOCUMENTS 5,195,339 A * 3/1993 Nee et al. ...................... 70/14
6,070,441 A * 6/2000 Bernstrom ..................... 70/58

\* cited by examiner

*Primary Examiner*—Yonel Beaulieu
(74) *Attorney, Agent, or Firm*—Joseph W. Holland

(57) ABSTRACT

A trailer security device includes a housing configured to permit placement over a trailer hitching device with the housing enclosing an enlarged perimeter segment of a trailer hitch. An enlarged perimeter segment is defined as an end portion of the trailer hitching device that is relatively larger in its perimeter or cross-sectional dimension than an adjoining or adjacent relatively narrow or reduced perimeter segment. A slot is formed on face of the housing and fits over a reduced perimeter segment of the trailer hitch while the enlarged perimeter segment of the trailer hitch will not pass through the slot. The hitch security device also includes a housing closure configured to close the entry aperture of the housing in a locking engagement.

22 Claims, 15 Drawing Sheets

TRAILER SECURITY DEVICE

RELATED APPLICATIONS

This application claims the priority of an application entitled Trailer Hitch Security Device filed Jan. 4, 1999, Ser. No. 09/228,543 to which this application is a continuation-in-part.

BACKGROUND OF THE INVENTION

1. Technical Field

The present invention is related to security devices for trailers and, more specifically, to a trailer security device including an enclosure configured to restrict access to the hitching member when the enclosure is closed and locked.

2. Background

There is a recognized need for providing security for trailers which are used for transportation and storage of a variety of goods. Trailers for domestic and industrial applications typically include a hitch having a receiver for receiving a ball which is employed by a towing vehicle for moving the trailer. A trailer may be configured having an extended front frame member configured as a substantially horizontal tongue having a receiver formed at the end. Alternatively, a "gooseneck" trailer includes a receiver formed at the end of a substantially vertical tongue. In the alternative, a trailer may include a "fifth-wheel" towing device including a kingpin, commonly configured having a neck and an enlarged annular plate.

So long as the trailer is secured to a vehicle, the trailer may be locked directly to the vehicle thereby providing a degree of security. However, trailers may be left unattended, sometimes for extended periods of time, and once the trailer hitch is removed from the vehicle and the trailer left unattended, it becomes a potential target for theft or removal by unauthorized personnel.

This problem has been recognized by a number of inventors who have taken a variety of approaches to providing locks and other security devices for trailer hitches. Some of these solutions include modifying the trailer hitch itself to include a locking mechanism. In other cases, the security device is configured as a boot, sleeve or strap which is configured to fit over the trailer hitch, the security device including a lock or means for locking of the device to the trailer hitch.

SUMMARY OF THE INVENTION

According to the present invention, a trailer security device includes a housing which is configured as an enclosure defining an internal cavity. The housing is configured to permit placement over a relatively narrow neck or reduced perimeter segment of a trailer hitching device with the housing enclosing a head or enlarged perimeter segment of a trailer hitch. An enlarged perimeter segment is defined as an end portion of the trailer hitching device that is relatively larger in its perimeter or cross-sectional dimension than an adjoining or adjacent relatively narrow or reduced perimeter segment.

A slot is formed on a first face of the housing and may be configured as an elongated cutaway. The slot fits over the reduced perimeter segment of the trailer hitch while the enlarged perimeter segment of the trailer hitch will not pass through the slot. The housing includes an entry aperture configured as a substantially open second face of the housing. The hitch security device also includes a housing closure which is configured to close the entry aperture in locking engagement with the housing. The housing closure includes a base which fits against or within the open face of the housing closing the entry aperture. The housing closure may also include a slot closure tab configured to fit against or within a portion of the slot thereby closing the slot and further restricting removal of the enlarged perimeter segment of the trailer hitch from the hitch security device.

In one embodiment of the invention, used to secure a trailer hitch including a substantially horizontal tongue configured to receive a ball, the enlarged perimeter segment comprises the receiver end of the trailer hitch and the reduced perimeter segment comprises the neck of the receiver. In an embodiment of the invention used to secure a trailer hitch including a "gooseneck" including a ball receiver, the enlarged perimeter segment comprises the receiver end of the gooseneck and the reduced perimeter segment comprises that portion of the gooseneck above the receiver end. In the embodiment of the invention for use on a fifth wheel hitching device, the enlarged perimeter segment comprises the annular plate of a kingpin and the reduced perimeter segment comprises a neck of a kingpin above the annular plate.

Removal or withdrawal of the trailer hitch security device, according to the present invention, from the trailer hitching device is prohibited by the corresponding fit of the trailer hitching device with the slot. Particularly, the relative configurations of the slot and the enlarged perimeter segment and the reduced perimeter segment of the trailer hitching device are such that while the slot is sized to accommodate placement over the reduced perimeter segment, withdrawal of the enlarged perimeter segment through the slot is made impossible.

In one embodiment of the invention, the receiver end of the trailer ball hitch may be configured originally or by modification to include a whole or partial collar member or an ear attached near the receiver end of the hitch which extends at an angle to a longitudinal axis of the trailer hitch, effectively forming an enlarged perimeter segment. In an alternate embodiment of the invention, removal or withdrawal of the receiver end of a trailer ball hitch may be further restricted by a receiver engaging element. The receiver engaging element may be configured as a trailer hitch ball which contacts the closure base.

The housing closure is secured to the housing by a locking device. The locking device may be configured as a pin attached to the housing which projects through an aperture formed in the closure base. The pin is located and configured to pass through the housing closure aperture when the housing closure is engaged with the housing. The pin is configured to engage with the second cooperating lock element in a locking manner. The second cooperating lock element is configured as a lock.

In an alternative embodiment of the invention, the locking device includes a bolting mechanism attached to the housing closure for securing the housing closure to the housing. The first cooperating lock element may be configured as at least one bolt slidingly attached to the housing closure and configured to permit a bolt to be selectively engaged or disengaged with the housing. A pin is attached to the bolt and projects through a slide aperture in the closure base. The second cooperating lock element is configured as a lock.

In use, once the enlarged perimeter segment is placed within the housing with the reduced perimeter segment of the hitch extending through the slot, the housing closure is engaged with the entry aperture of the housing and the first cooperating lock element is engaged with the second cooperating lock element. Once the trailer security device is secured to the end of the hitch, the enlarged perimeter segment may not be withdrawn from the device.

Additional objects, advantages and novel features of the invention will be set forth in part in the description that follows, and in part will become apparent to those skilled in the art upon examination of the following, or may be learned by practice of the invention. The objects and advantages of the invention may be realized and attained by means of the instrumentalities and combinations particularly pointed out in the appended claims.

DETAILED DESCRIPTION OF THE INVENTION

Figure 1:
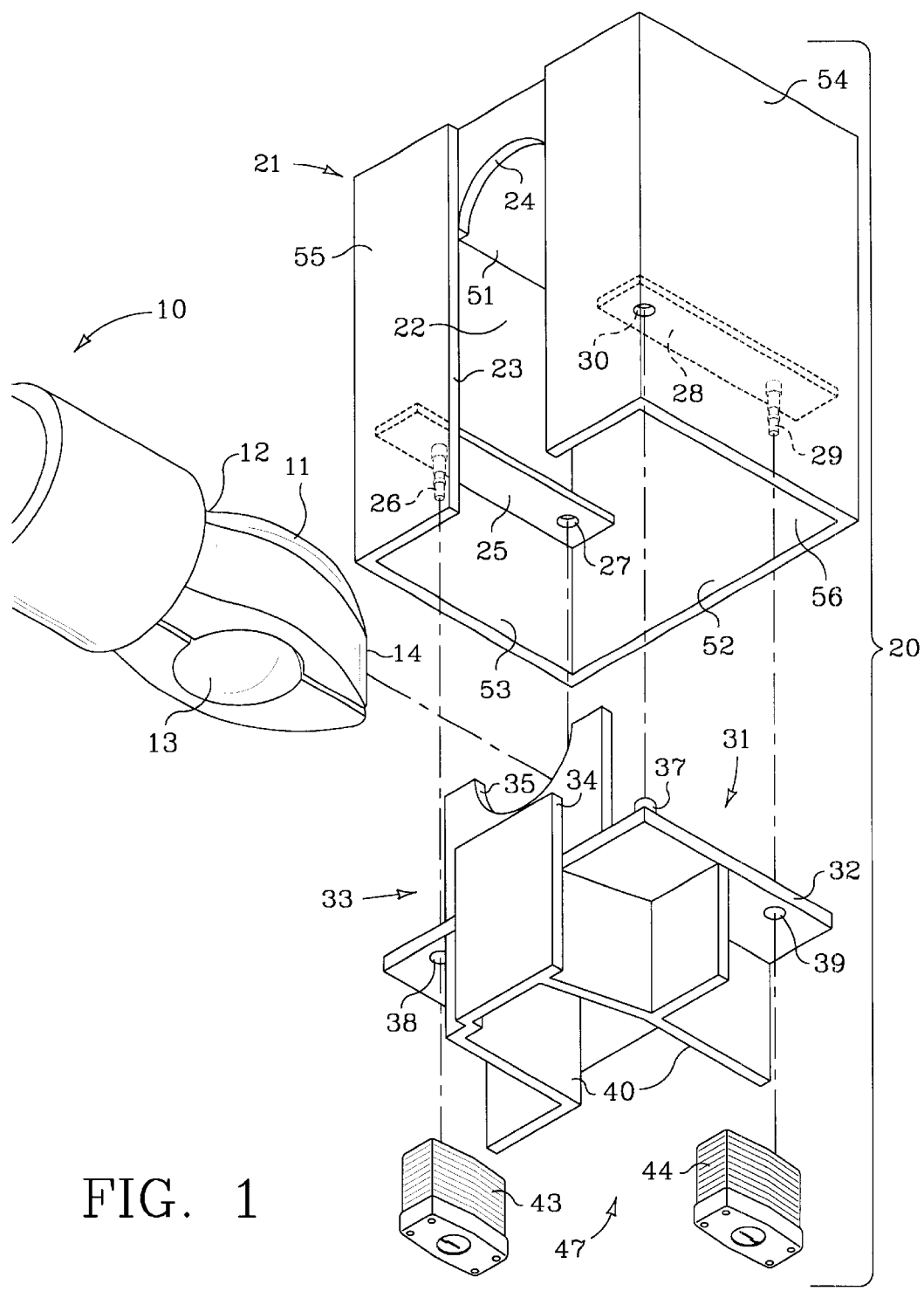
FIG. 1 is an exploded perspective representational view of one embodiment of a trailer security device according to the present invention.

Referring now to the Figures, the trailer security device will be more fully described. Referring to FIG. 1, trailer hitch 10 for a ball type trailer hitch includes receiver end 14 and is shown having enlarged perimeter segment 11 and a relatively narrow reduced perimeter segment 12. Trailer hitch 10 is shown in position for placement within trailer security device 20. Trailer hitch 10 also includes a receiver 13 for receiving a trailer hitch ball (not shown).

FIG. 1 also shows trailer security device 20 including housing 21 and housing closure 31. Housing 21 includes top panel 51, back panel 52, first side panel 53, second side panel 54 and first face panel 55. Housing 21 also includes entry aperture 56 configured to allow passage of enlarged perimeter segment 11 of receiver end 14 into enclosure cavity 22. Slot 23 is formed in first face panel 55 and is sized so that it is wide enough to permit entry of reduced perimeter segment 12 yet narrow enough that enlarged perimeter segment 11 will not pass.

Figure 5:
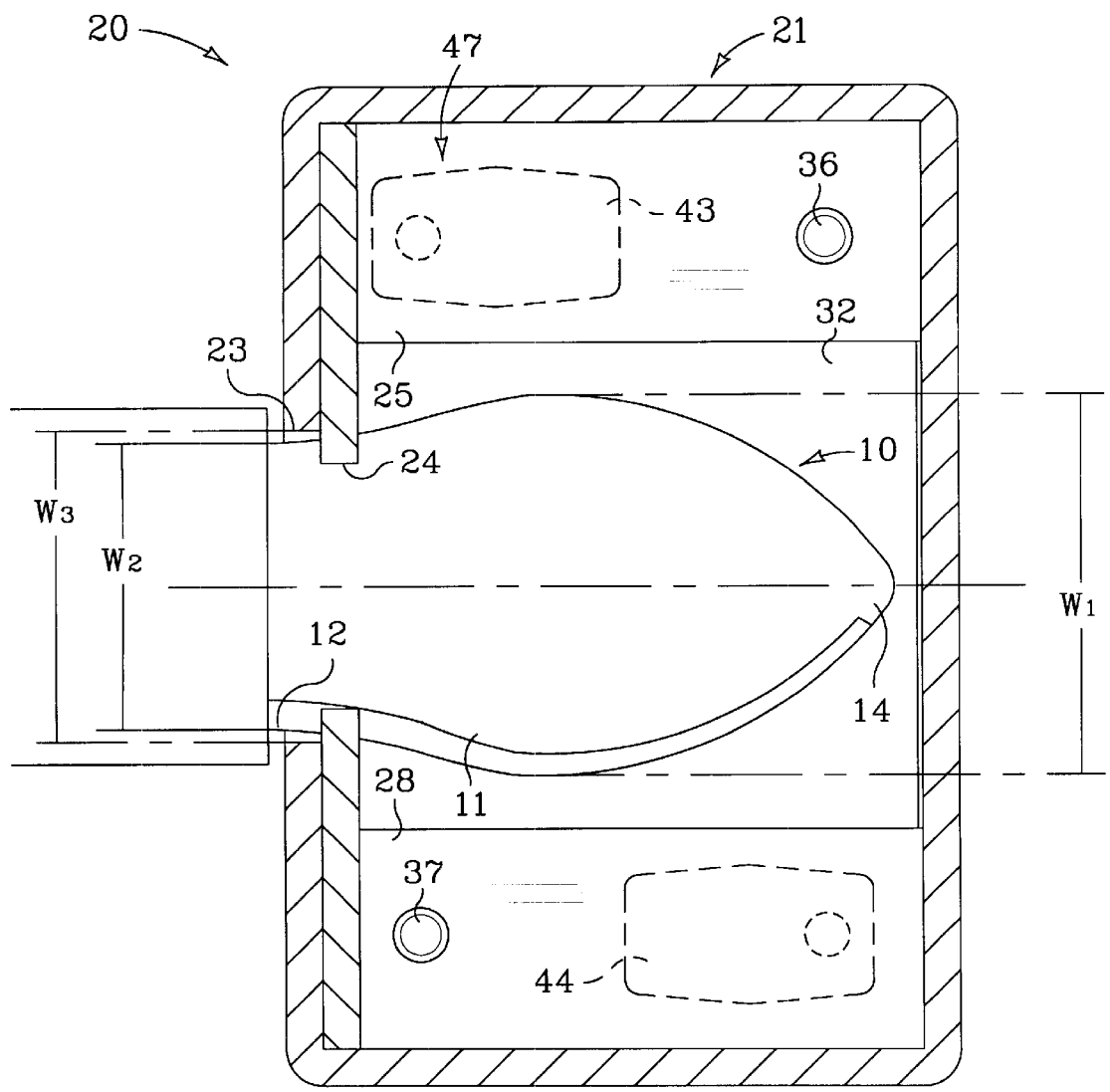
FIG. 5 is a bottom cutaway representational view of one embodiment of a trailer security device according to the present invention.

FIG. 5 shows housing 21 placed over receiver end 14 of trailer hitch 10. Slot 23 is defined having a width $W_3$ which is slightly greater than the cross-sectional width $W_2$ of reduced perimeter segment 12 and slightly less than cross-sectional width $W_1$ of enlarged perimeter segment 11. This configuration prohibits withdrawal of receiver end 14 of trailer hitch 10 through slot 23.

Referring again to FIG. 1, slot 23 may be configured to include first neck saddle 24 which is shaped to provide a generally contoured fit and therefore a more restrictive fit against relatively reduced perimeter segment 12.

Housing 21 includes first land 25 which is attached to the inside surface of first side panel 53 and second land 28 which is attached to the inside surface of second side panel 54. First land 25 includes a first pin 26 and first location aperture 27. Second land 28 similarly includes a second pin 29 and second location aperture 30.

Housing closure 31 includes closure base 32 and slot closure tab 33. Slot closure tab 33 includes tongue 34 which, in this embodiment of the invention, is sized to provide a sliding fit within slot 23. Slot closure tab 33 also includes second neck saddle 35 which is configured to provide a generally contoured fit to the underside of relatively reduced perimeter segment 12 of trailer hitch 10.

Housing closure 31 also includes second location dowel 37 which is attached to the upper face of closure base 32 and is positioned and configured for sliding engagement with second location aperture 30. Closure base 32 is also configured to include first pin aperture 38 and second pin aperture 39 which are sized and located for sliding engagement with first pin 26 and second pin 29 respectively.

FIG. 1 also shows a locking device generally as lock assembly 47 which includes first lock 43 configured for locking engagement with first pin 26 and second lock 44 configured for locking engagement with second pin 29.

Closure base 32 also includes a plurality of reinforcement fins 40 which are configured to provide rigidity to the structure of closure base 32 as well as protection for device components, particularly first lock 43 and second lock 44.

Figure 2:
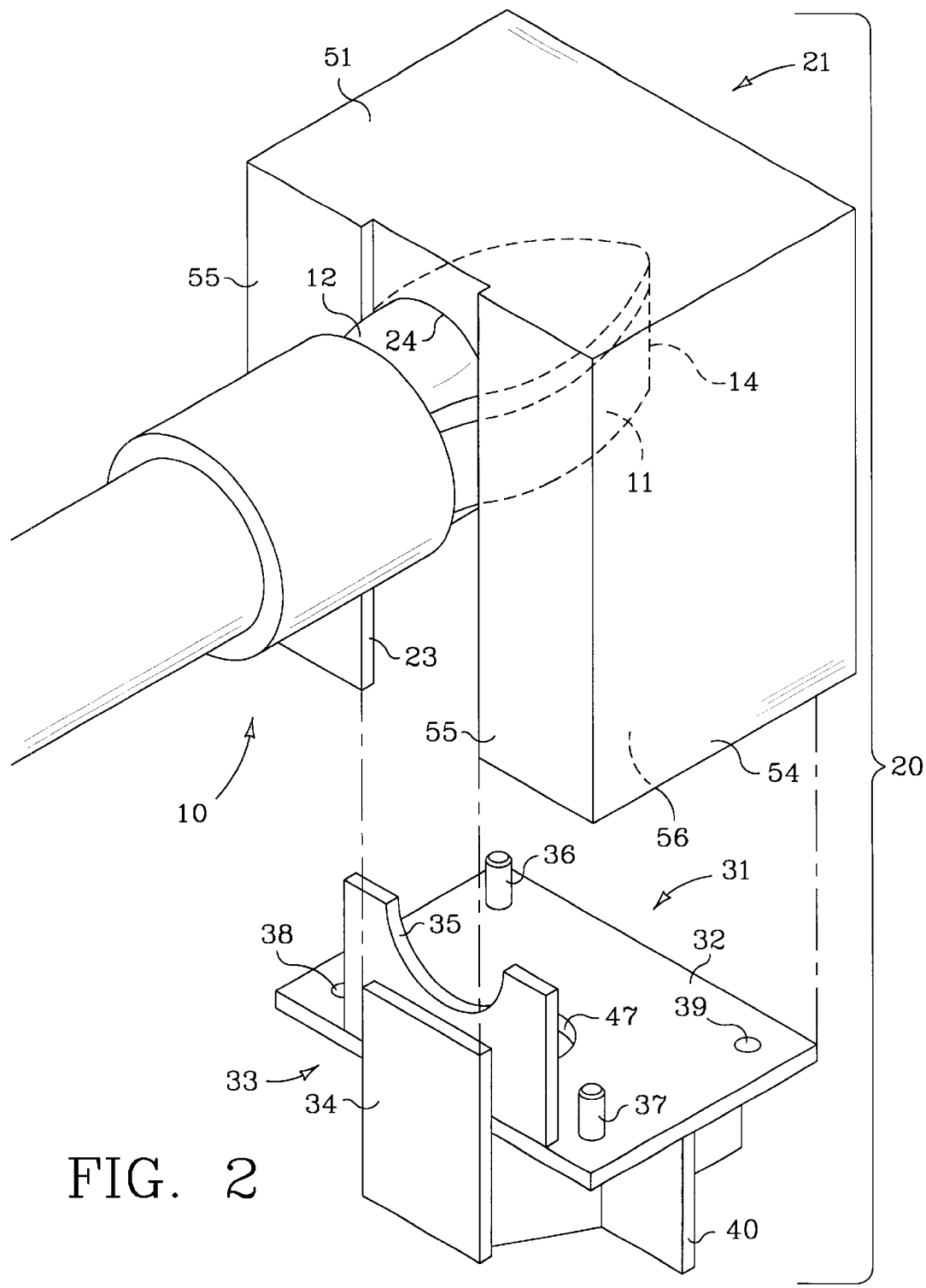
FIG. 2 is an exploded perspective representational view of one embodiment of a trailer security device according to the present invention.

Referring to FIG. 2, trailer hitch 10 is shown including receiver end 14 having enlarged perimeter segment 11 placed within housing 21. Specifically, slot 23 is shown placed over relatively reduced perimeter segment 12 with first neck saddle 24 resting against the upper portion of relatively reduced perimeter segment 12.

FIG. 2 also shows housing closure 31 including closure base 32 and slot closure tab 33. Once again, slot closure 33 is shown including tongue 34 and second neck saddle 35. Also shown in FIG. 2 is first location dowel 36 which cooperates with first location aperture 27 (not shown in FIG. 2) to provide alignment of housing closure 31 within housing 21. FIG. 2 also shows ball stem aperture 47 which is sized to accept the stem of a trailer hitch ball (not shown in FIG. 2).

Figure 3:
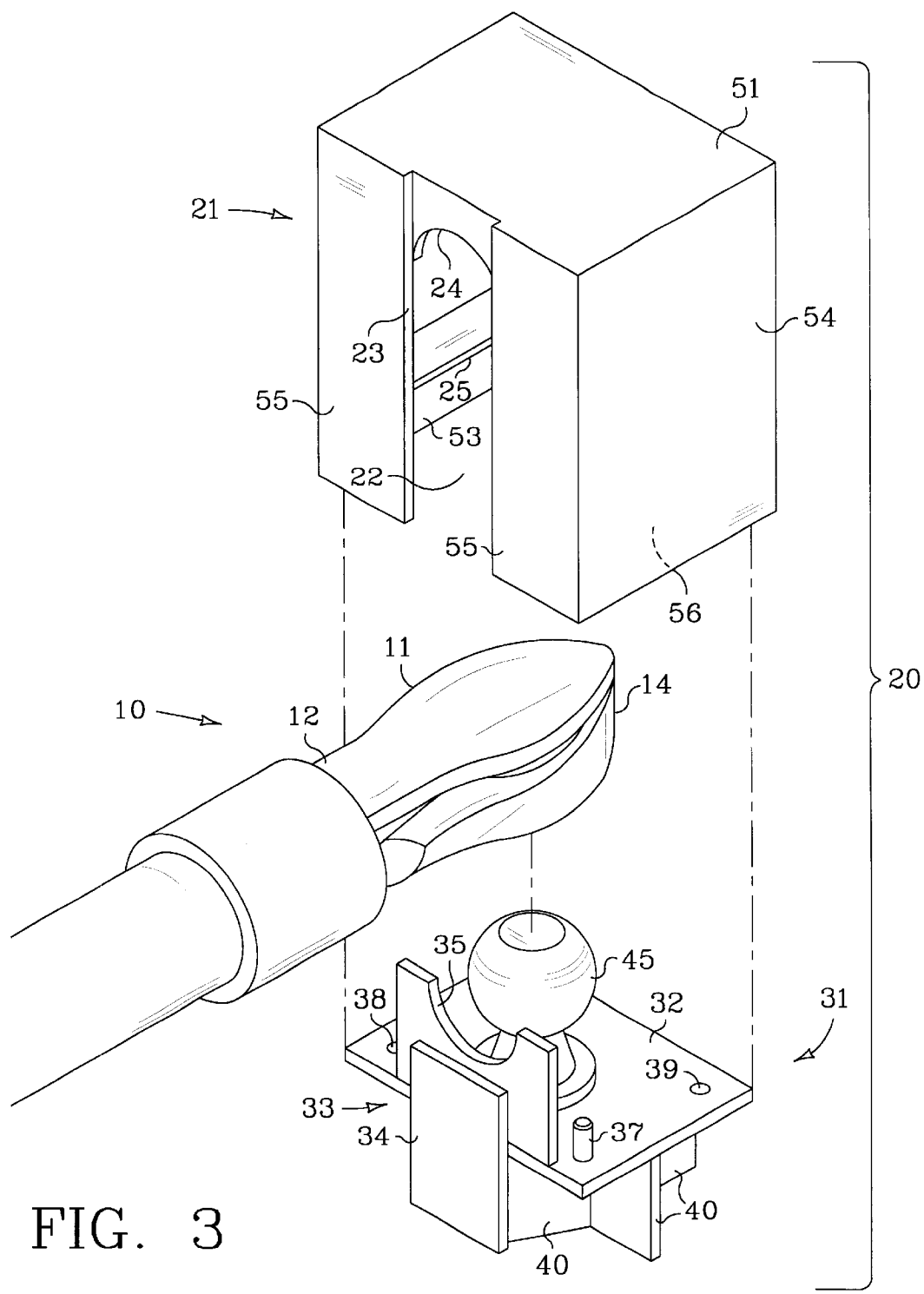
FIG. 3 is an exploded perspective representational view of one embodiment of a trailer security device according to the present invention.

Referring to FIG. 3, an alternate embodiment of trailer security device 20 is shown including trailer hitch ball 45 which is shown placed on the upper surface of closure base 32. Housing closure 31 is also shown including slot closure tab 33 including tongue 34 and second neck saddle 35, second location dowel 37, first pin aperture 38 and second pin aperture 39. Reinforcement fins 40 are shown attached to the underside of closure base 32. FIG. 3 also shows housing 21 including receiver entry slot 23 formed in first face panel 55, slot 23 including first neck saddle 24.

As shown in FIG. 3, trailer hitch 10 is positioned for placement within trailer security device 20. Receiver 1 3 (not shown in FIG. 3) will engage trailer hitch ball 45 shown attached to closure base 32. Next, housing 21 will be placed over trailer hitch 10 by sliding receiver entry slot 23 over relatively reduced perimeter segment 12 with enlarged perimeter segment 11 of receiver end 14 placed within enclosure cavity 22 until first neck saddle 24 rests against the upper portion of relatively reduced perimeter segment 12. At this point, housing closure 31 is engaged within entry aperture 56 of housing 21 with the lower side of relatively reduced perimeter segment 12 resting against second neck saddle 35. In this position, the upper portion of closure base 32 abuts first land 25 and second land 28 (not shown in FIG. 3).

Figure 4:
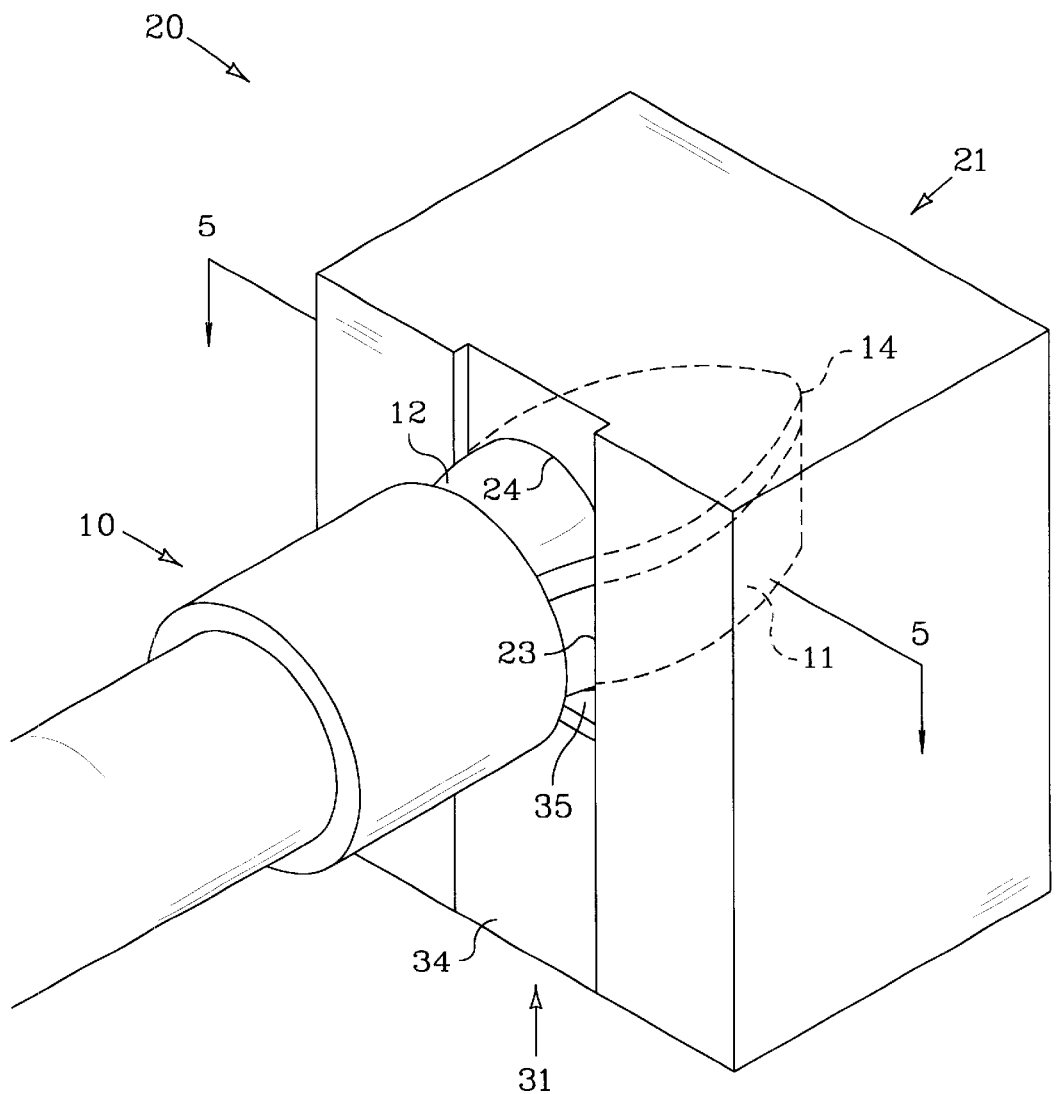
FIG. 4 is a perspective representational view of one embodiment of a trailer security device according to the present invention.

Referring to FIG. 4, trailer hitch 10 is shown with receiver end 14 having enlarged perimeter segment 11 secured within trailer security device 20. Particularly, slot 23 is shown abutting relatively reduced perimeter segment 12 with first neck saddle 24 resting against the top portion of relatively narrow portion 12 and second neck saddle 35 resting against the lower portion of relatively reduced perimeter segment 12. FIG. 4 also shows housing closure 31 including tongue 34 slidingly engaged within slot 23.

Referring to FIG. 5, trailer hitch 10 is shown with receiver end 14 having enlarged perimeter segment 11 secured within trailer security device 20. Particularly, slot 23 is shown abutting relatively reduced perimeter segment 12. FIG. 5 also shows closure base 32 slidingly engaged within housing 21. Also shown in FIG. 5 is first location dowel 36 attached to the upper face of closure base 32. Similarly, second location dowel 37 is shown attached to the upper face of closure base 32. Finally, FIG. 5 shows the relative locations of first lock 43 and second lock 44.

Figure 6:
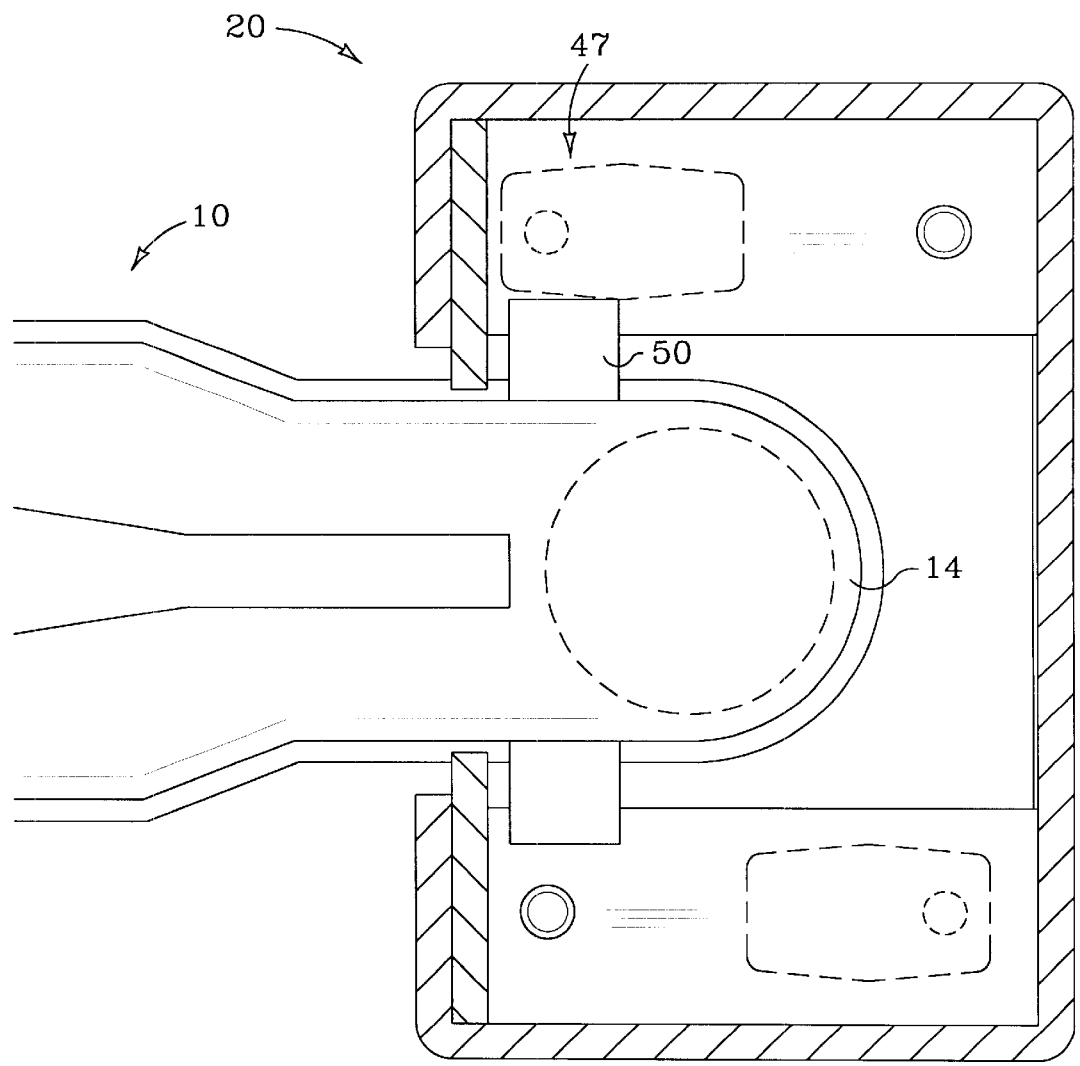
FIG. 6 is a bottom cutaway representational view of an alternate embodiment of a trailer security device according to the present invention.

FIG. 6 shows an alternate embodiment of the trailer security device 20 which is configured for placement over trailer hitch 10 which does not have a relatively narrow neck. In this case, ears 50 are attached near receiver end 14 of trailer hitch 10 in such a manner as to restrict passage of trailer security device 20 from the receiver end of trailer hitch 10 when trailer security device 20 is secured.

Figure 7:
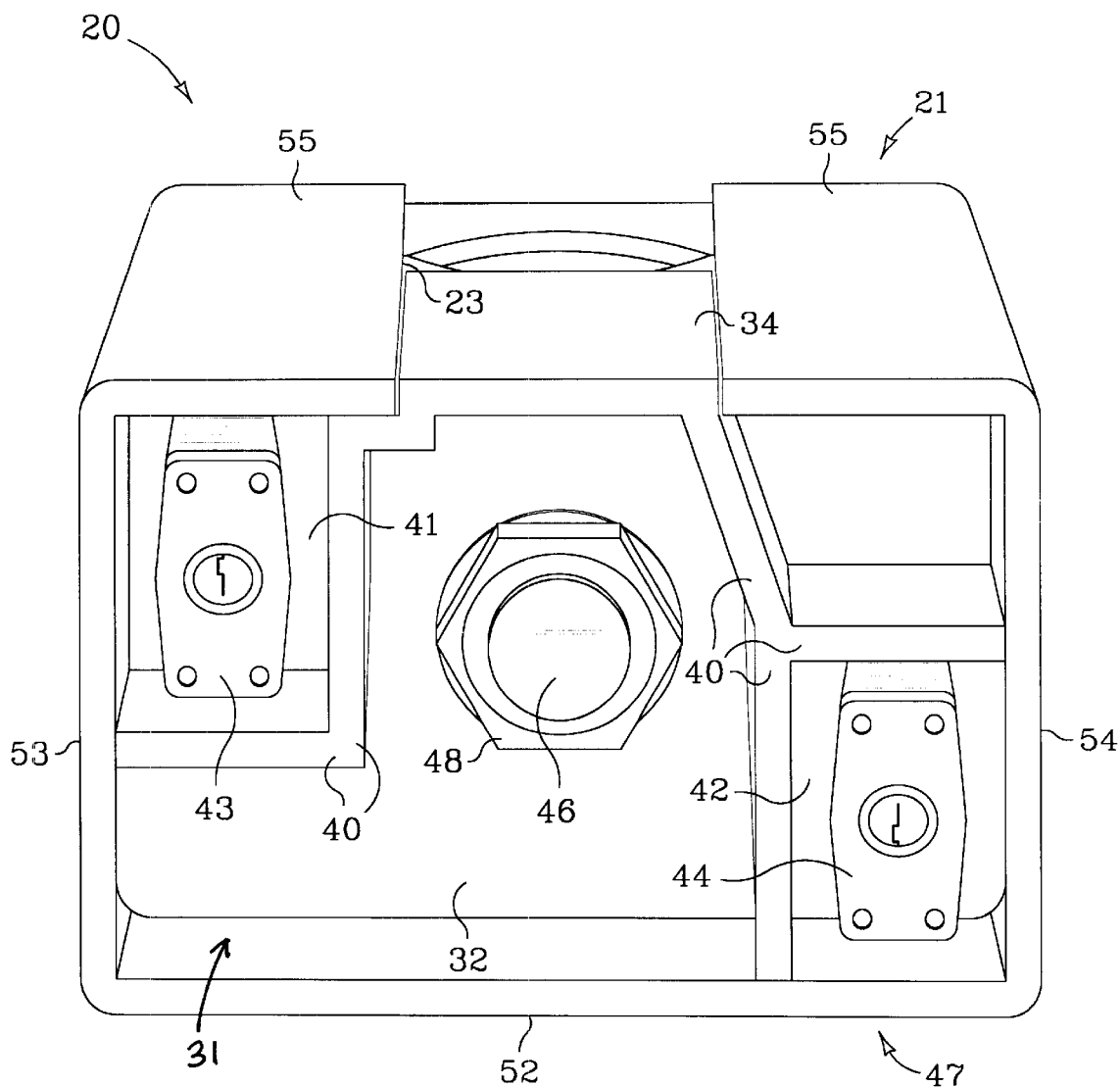
FIG. 7 is a perspective representational view of an embodiment of a trailer security device according to the present invention.

FIG. 7 shows trailer security device 20 including housing closure 31 inserted within housing 21. Reinforcement fins 40 are shown attached to closure base 32 in such a manner as to form a first lock compartment 41 and second lock compartment 42 for providing limited access to and security for first lock 43 and second lock 44. FIG. 7 shows ball stem 46 extending through closure base 32 and secured using nut 48. Finally, FIG. 7 shows tongue 34 slidingly engaged within slot 23.

Figure 8:
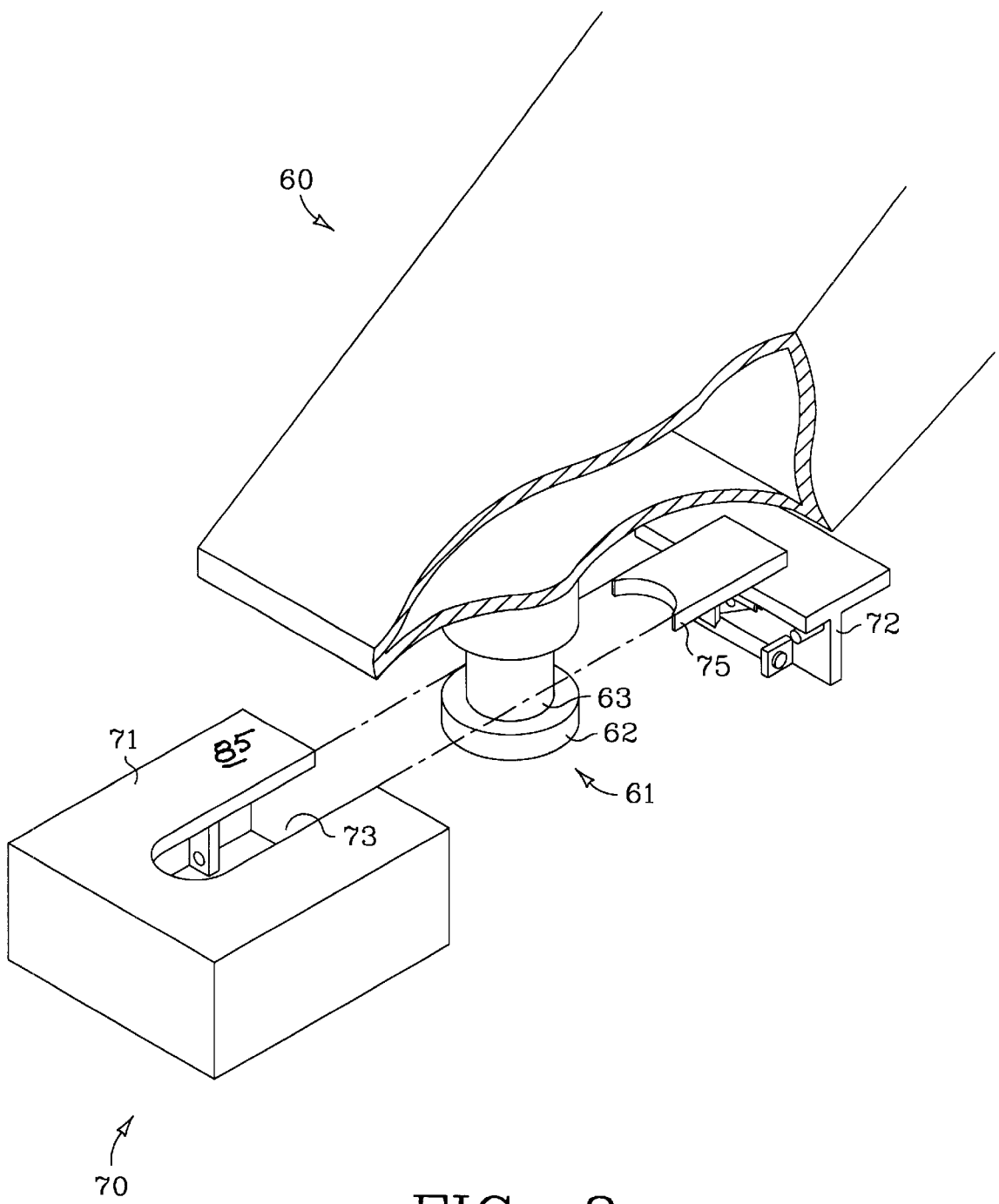
FIG. 8 is an exploded perspective representational view of one embodiment of a trailer security device according to the present invention.

Referring to FIG. 8, fifth wheel trailer hitch 60 is shown including kingpin 61 having enlarged perimeter segment 62 formed in this case by the annular plate of kingpin 61 and relatively narrow reduced perimeter segment 63 formed in this case by the neck of kingpin 61. Trailer hitch 60 is shown in position for placement within trailer security device 70. Housing 71 is configured to allow passage of enlarged perimeter segment 61 into housing 71. FIG. 8 also shows trailer security device 70 including housing 71 and housing closure 72. Slot 73 is formed in first face panel 85 and is sized so that it is wide enough to permit entry of reduced perimeter segment 63 yet narrow enough that enlarged perimeter segment 62 will not pass.

Figure 9:
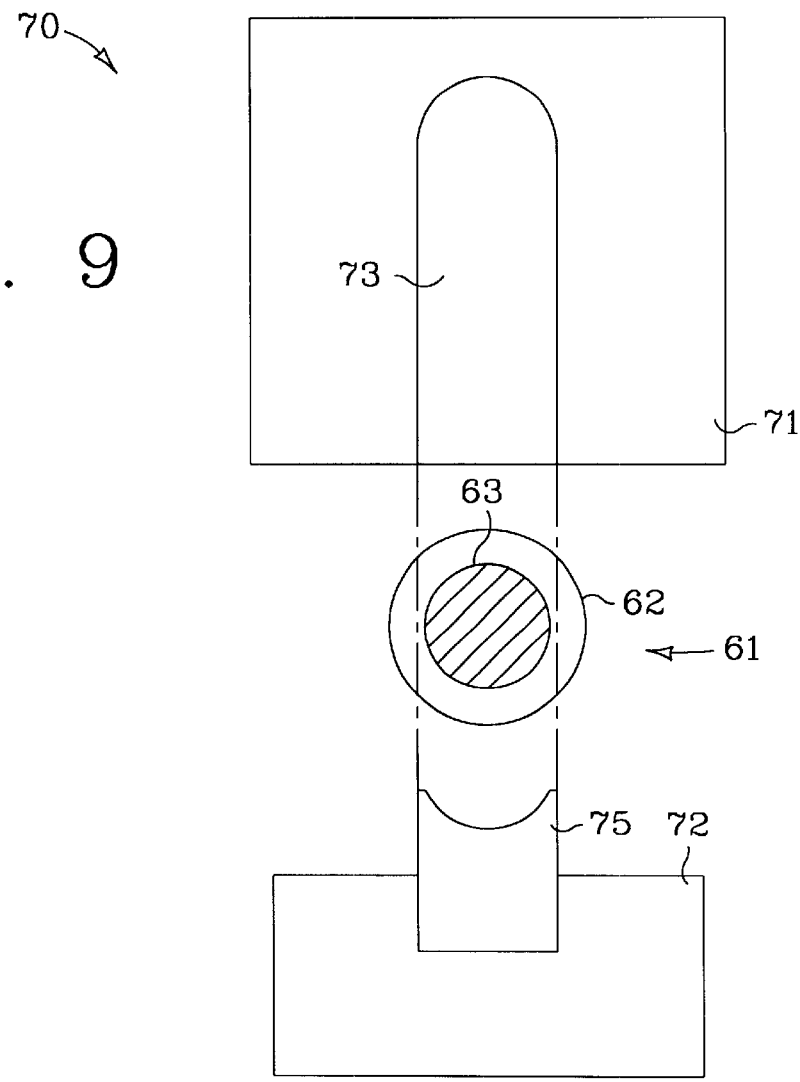
FIG. 9 is an exploded top representational view of one embodiment of a trailer security device according to the present invention.
Figure 10:
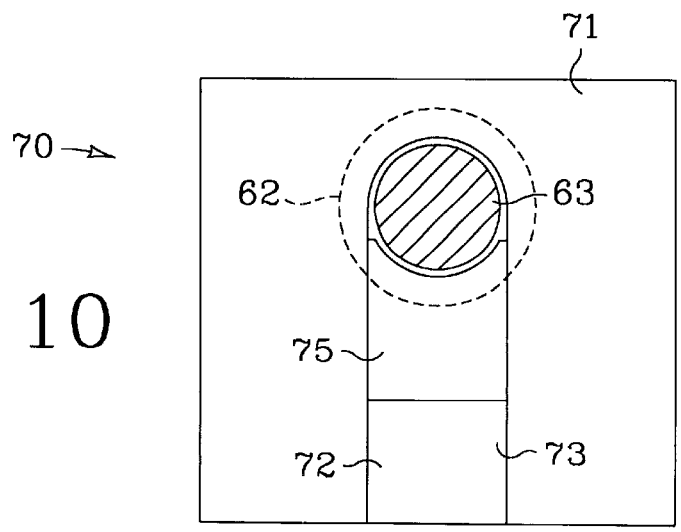
FIG. 10 is a top representational view of one embodiment of a trailer security device according to the present invention.

Referring to FIGS. 9 and 10, trailer security device 70 is shown including housing 71 and housing closure 72. In FIG. 9, housing closure 72 is disengaged from housing. In FIG. 10, trailer hitch 60 is shown having kingpin 61 including enlarged perimeter segment 62 secured within trailer security device 70. Housing closure 72 is engaged with housing 71 enclosing kingpin 61 within housing 71. Slot 73 is shown abutting relatively reduced perimeter segment 63. Slot closure tab 75 is slidingly engaged within slot 73.

Figure 11:
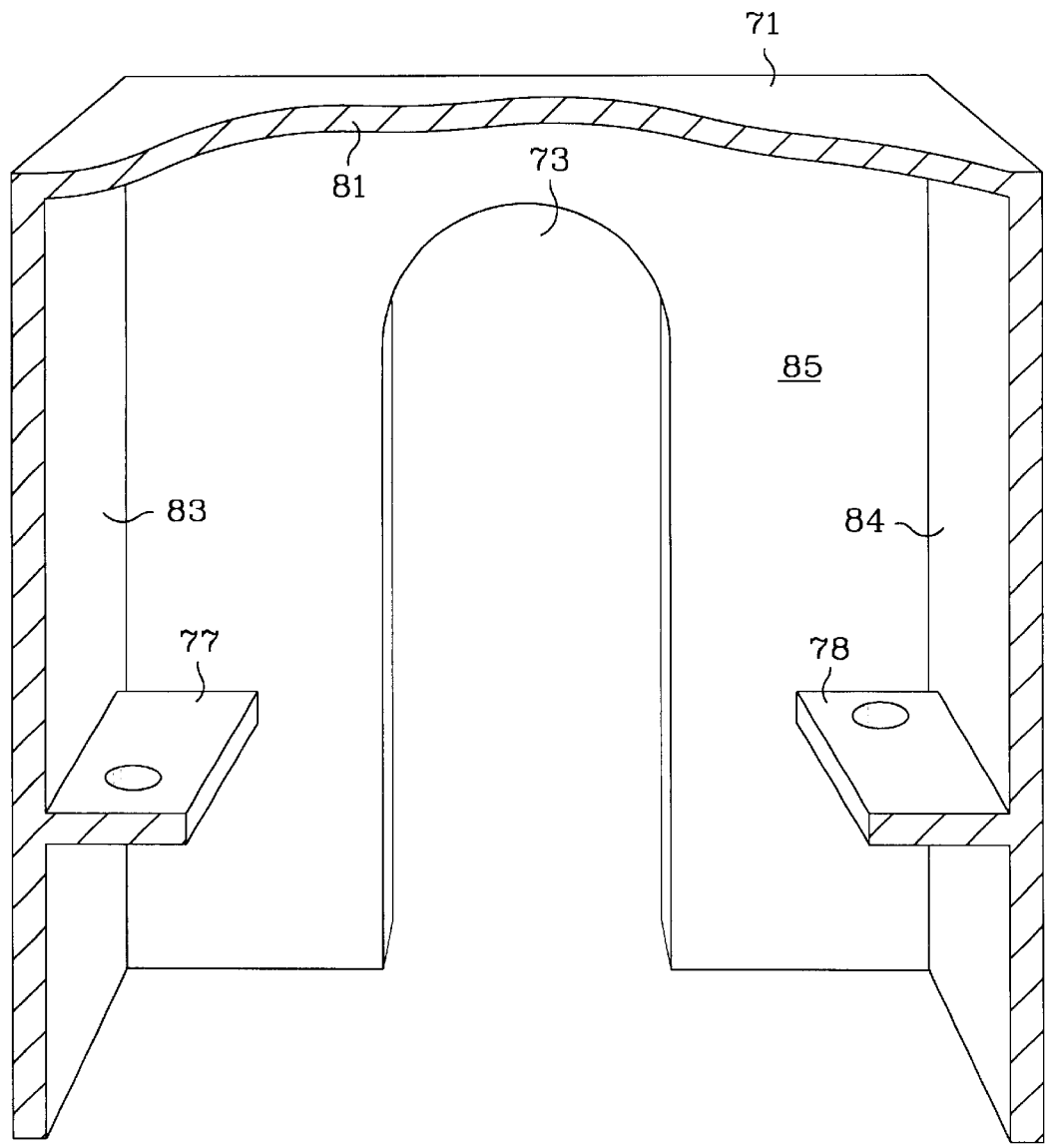
FIG. 11 is a bottom cutaway representational view of a housing for a trailer security device according to the present invention.
Figure 12:
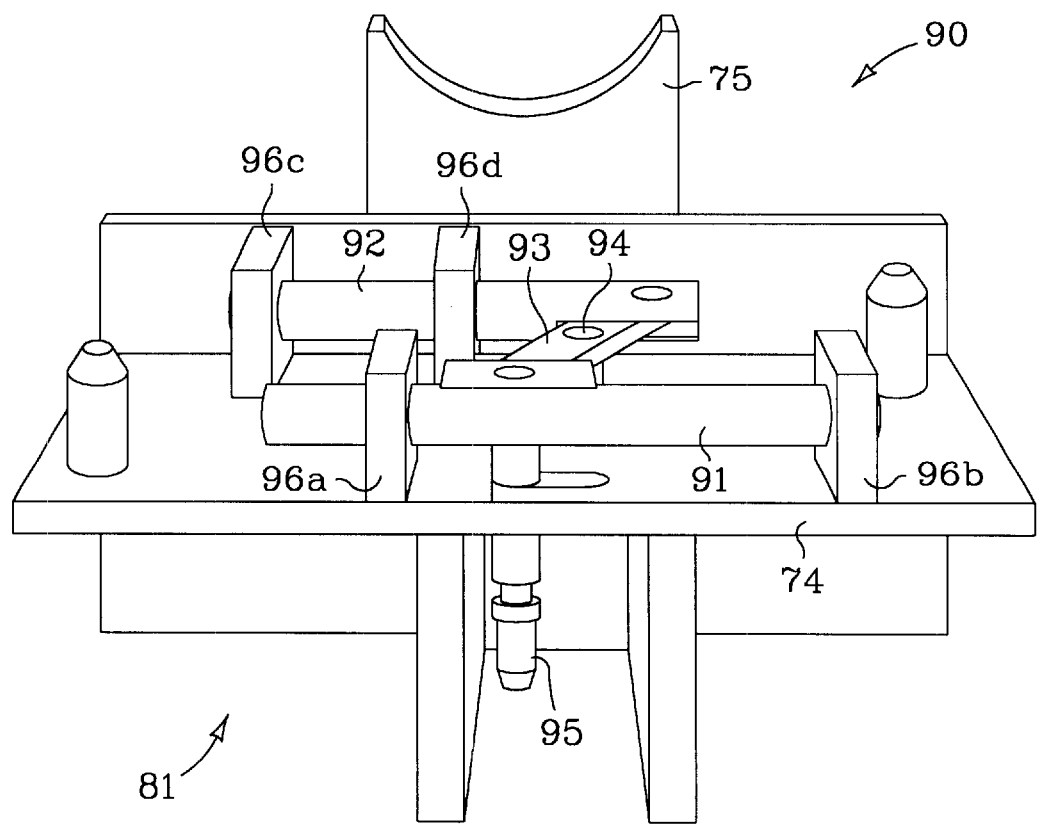
FIG. 12 is a perspective representational view of a housing closure for a trailer security device according to the present invention.
Figure 13:
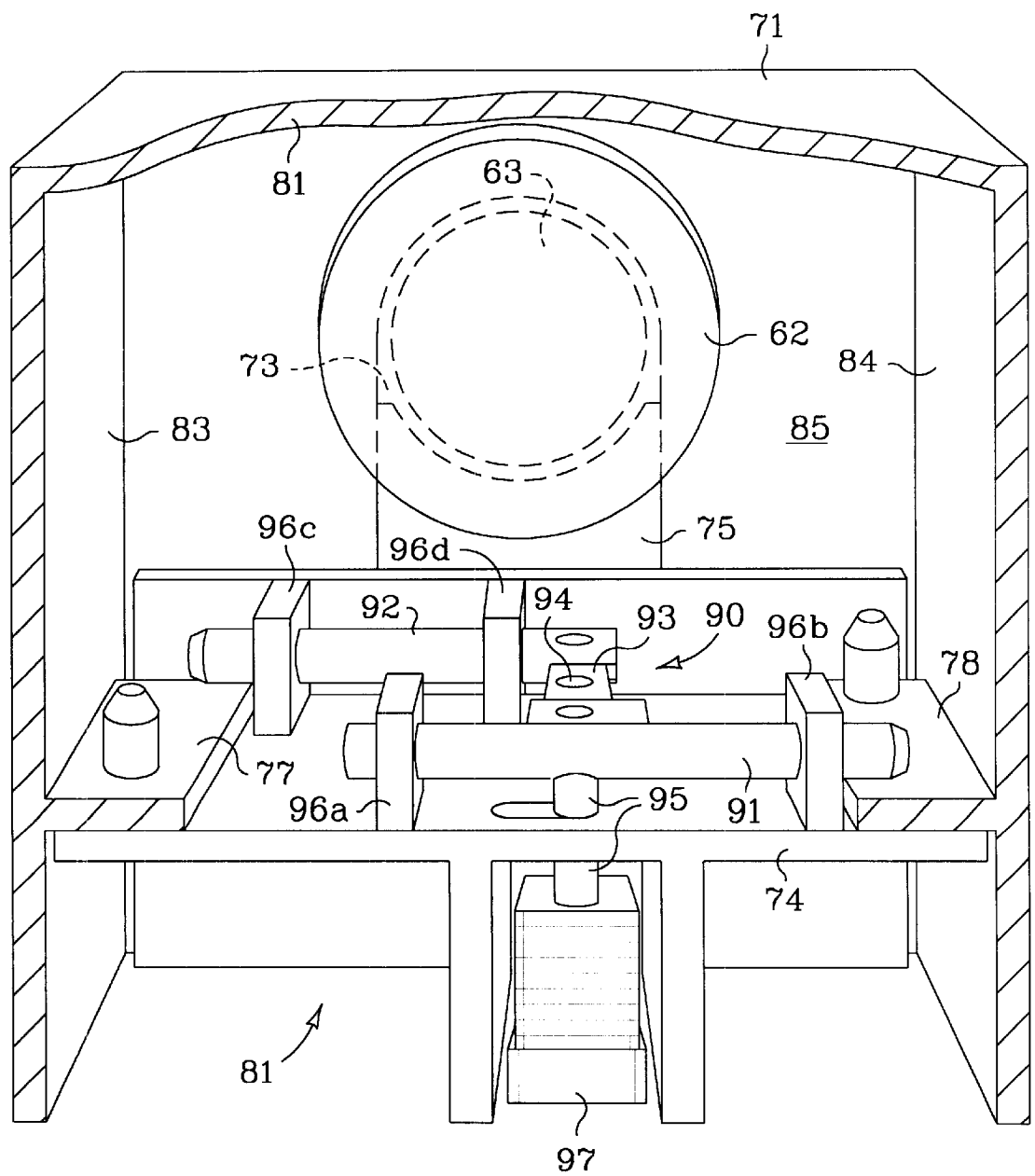
FIG. 13 is a bottom cutaway representational view of an embodiment of a trailer security device according to the present invention.
Figure 14:
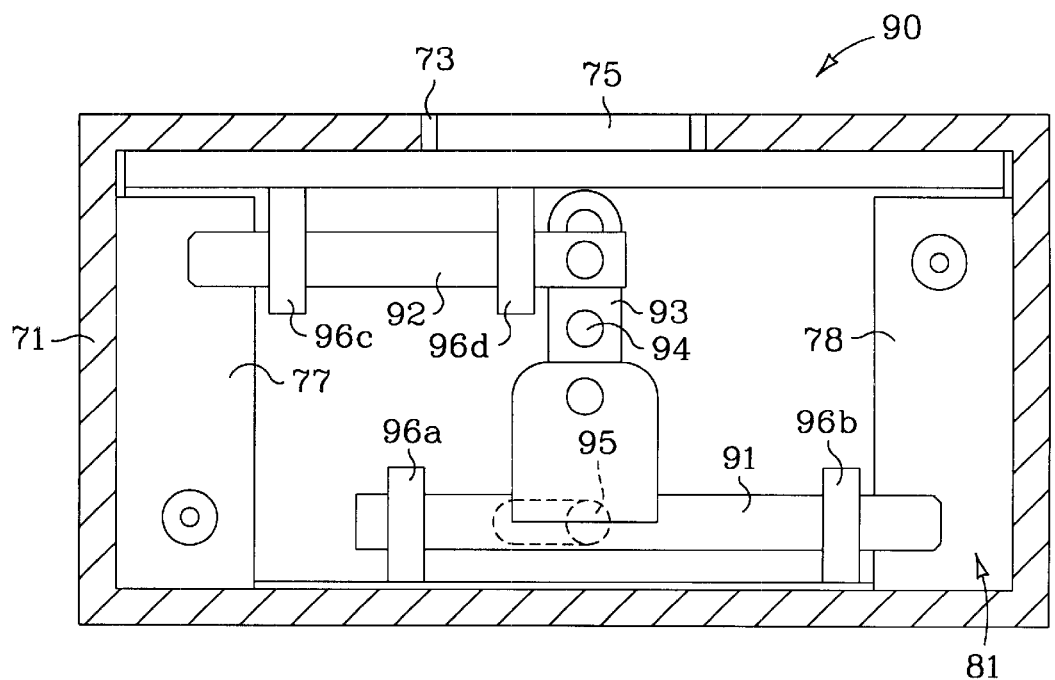
FIG. 14 is a top representational view of a housing closure for a trailer security device according to the present invention.
Figure 15:
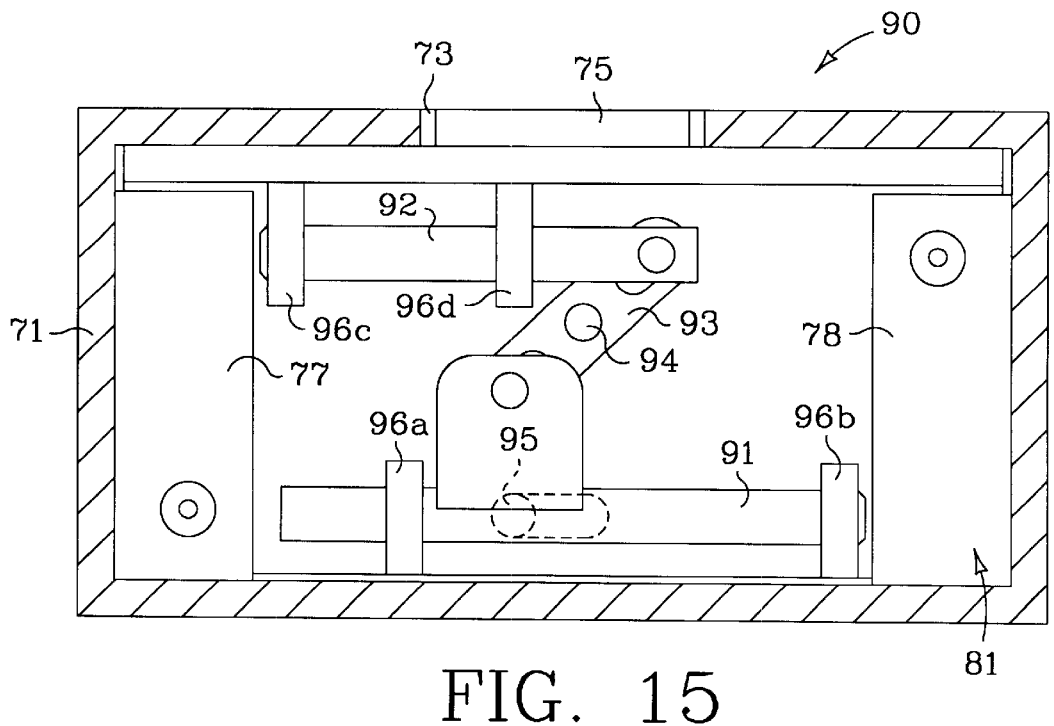
FIG. 15 is a top representational view of a housing closure for a trailer security device according to the present invention.

As shown in FIGS. 11 and 13, housing 71 includes first land 77 which is attached to the inside surface of first side panel 83 and second land 78 which is attached to the inside surface of second side panel 84. Housing 71 includes top panel 81 and first face panel 85.

FIGS. 12 through 15 show to advantage an alternate embodiment of a locking device shown generally as bolt assembly 90. Housing closure 81 includes closure base 74 and slot closure tab 75. Slot closure tab 75 is sized to provide a sliding fit within slot 73. Bolt assembly 90 includes first bolt 91 and second bolt 92 pivotally attached to pivot arm 93 and closure base 74 by pivot pin 94. Slide 95 is operable to move first bolt 91 and second bolt 92 through bolt guides 96A and 96B and 96C and 96D respectively. In a locked position, first bolt 91 and second bolt 92 project past the edge of first land 77 and second land 78 respectively. Lock 97 engages slide 95 eliminating the ability to remove housing closure 72 from housing 71. In an unlocked position, lock 97 is removed from slide 95, first bolt 91 and second bolt 92 are withdrawn within the edge of first land 77 and the edge of second land 78 respectively, permitting removal of housing closure 72 from housing 71.

Figure 16:
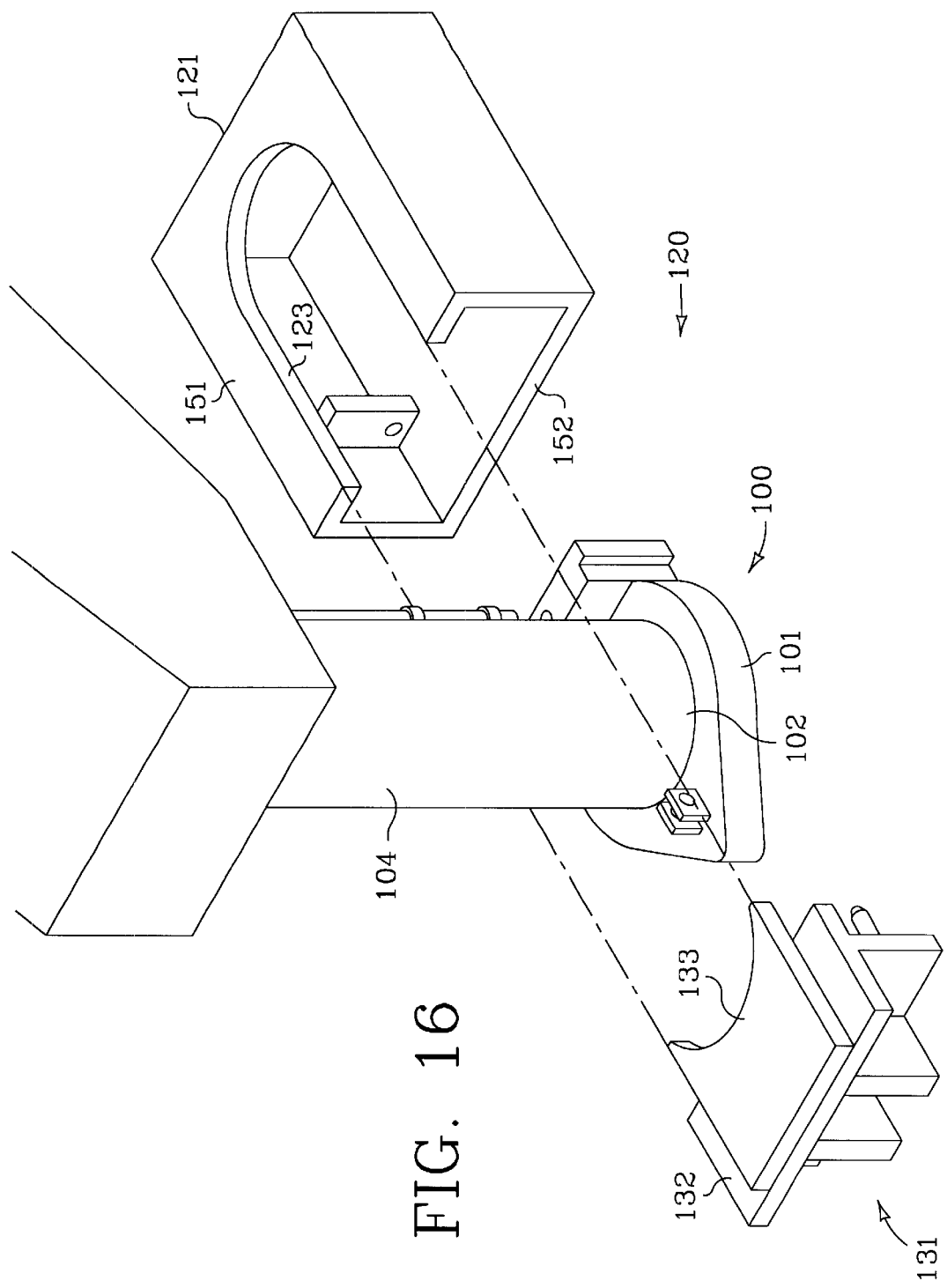
FIG. 16 is a perspective representational view of a housing closure for a trailer security device according to the present invention.

Referring to FIG. 16, trailer hitch 100 for a ball type trailer hitch having a gooseneck 104 is shown having enlarged perimeter segment 101 and a relatively narrow reduced perimeter segment 102. Trailer hitch 100 is shown in position for placement within trailer security device 120.

FIG. 16 also shows trailer security device 120 including housing 121 and housing closure 131. Housing 121 includes first face panel 151. Housing 121 also includes entry aperture 152 configured to allow passage of enlarged perimeter segment 101 of gooseneck 104 into housing 121. Slot 123 is formed in first face panel 151 and is sized so that it is wide enough to permit entry of reduced perimeter segment 102 yet narrow enough that enlarged perimeter segment 101 will not pass.

As illustrated in various alternate embodiments, slot 123 is defined having a width slightly greater than the cross-sectional width reduced perimeter segment 102 and slightly less than cross-sectional width of enlarged perimeter segment 101. This configuration prohibits withdrawal of receiver end 104 of trailer hitch 100 through slot 123.

Housing closure 131 includes closure base 132 and slot closure tab 133. Slot closure tab 133 is sized to provide a sliding fit within slot 123.

Figure 17:
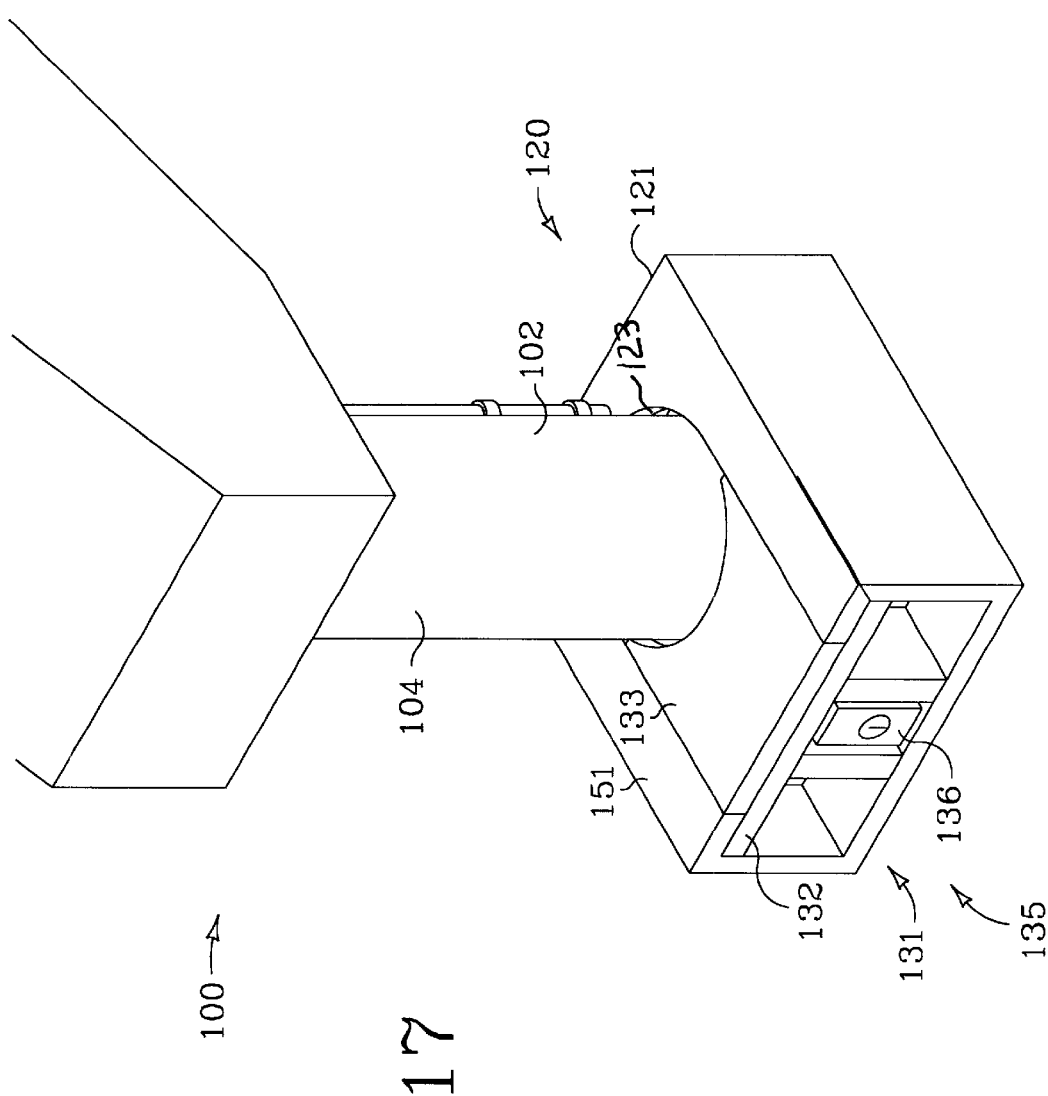
FIG. 17 is a perspective representational view of a housing closure for a trailer security device according to the present invention.

FIG. 17 shows trailer hitch 100 with gooseneck 104 secured within trailer security device 120. Reduced perimeter segment 102 is shown extending through slot 123. Housing closure 131 including closure tab 133 is slidingly engaged within slot 123. FIG. 17 shows locking device generally as bolt assembly 135 which is shown including lock 136.

While this invention has been described with reference to the described embodiments, this is not meant to be construed in a limiting sense. Various modifications to the described embodiments, as well as additional embodiments of the invention, will be apparent to persons skilled in the art upon reference to this description. It is therefore contemplated that the appended claims will cover any such modifications or embodiments as fall within the true scope of the invention.

I claim:

1. A trailer hitch security device comprising:
    a housing configured as an enclosure, the housing including a first face including a slot and a second face including an entry aperture;
    a housing closure engaged with the entry aperture; and
    a locking device connected between the housing and the housing closure for restricting disengagement of the housing from the housing closure.

2. The trailer security device of claim 1 wherein the housing closure further comprises a slot closure tab attached to and extending from the housing closure, the slot closure tab engageable with the slot.

3. The trailer security device of claim 1 wherein the slot further comprises a width, the width greater than the cross-sectional width of a reduced perimeter segment of a trailer hitch device and, the width less than the cross-sectional width of an enlarged perimeter segment of the trailer hitch device.

4. The trailer security device of claim 1 wherein the locking device further comprises a pin attached to the housing, the pin located and configured to pass through an aperture formed in the housing closure upon engaging the housing closure with the housing, the pin configured for engagement with a lock.

5. The trailer security device of claim 1 wherein the locking device further comprises a bolt assembly including a bolt slideably connected to the housing closure and configured to be selectively engageable with the housing and a lock engageable with the bolt.

6. The trailer security device of claim 1 wherein the slot further comprises a width, the width greater than the cross-sectional width of a reduced perimeter segment of a ball type trailer hitch device and, the width less than the cross-sectional width of an enlarged perimeter segment of the ball type trailer hitch device.

7. The trailer security device of claim 1 wherein the slot further comprises a width, the width greater than the cross-sectional width of a reduced perimeter segment of a gooseneck type trailer hitch device and, the width less than the cross-sectional width of an enlarged perimeter segment of the gooseneck type trailer hitch device.

8. The trailer security device of claim 1 wherein the slot further comprises a width, the width greater than the cross-sectional width of a reduced perimeter segment of a fifth wheel type trailer hitch device and, the width less than the cross-sectional width of an enlarged perimeter segment of the fifth wheel type trailer hitch device.

9. The trailer security device of claim 6 further comprising a receiver engaging element connected to the housing closure.

10. The trailer security device of claim 9 wherein the receiver engaging element further comprises a trailer hitch ball connected to the housing closure.

11. A trailer hitch security device comprising:
    a housing configured as an enclosure, the housing including a first face including a slot and a second face including an entry aperture, the slot further including a width, the width greater than the cross-sectional width of a reduced perimeter segment of a trailer hitch device and, the width less than the cross-sectional width of an enlarged perimeter segment of the trailer hitch device, the housing configured to be placed over an enlarged perimeter segment of a ball type trailer hitch and the slot configured to restrict passage of the enlarged perimeter segment from the housing when the slot is placed over a reduced perimeter segment of the ball type trailer hitch;
    a housing closure engageable with the housing; and
    a locking device connected between the housing and the housing closure for restricting disengagement of the housing from the housing closure.

12. The trailer hitch security device of claim 11 wherein the housing closure further comprises a slot closure tab attached to and extending from the closure base, the slot closure tab engageable with the slot.

13. The trailer security device of claim 11 wherein the locking device further comprises a pin attached to the housing, the pin located and configured to pass through an aperture formed in the housing closure upon engaging the housing closure with the housing, the pin configured for engagement with a lock.

14. The trailer security device of claim 11 wherein the locking device further comprises a bolt assembly including a bolt slideably connected to the housing closure and configured to be selectively engageable with the housing and a lock engageable with the bolt.

15. The trailer security device of claim 11 further comprising a receiver engaging element connected to the housing closure.

16. The trailer security device of claim 15 wherein the receiver engaging element further comprises a trailer hitch ball connected to the housing closure.

17. A trailer hitch security device comprising:
    a housing configured as an enclosure, the housing including a first face including a slot and a second face including an entry aperture, the housing configured to be placed over an enlarged perimeter segment of a fifth wheel type trailer hitch and the slot configured to restrict passage of the enlarged perimeter segment from the housing when the slot is placed over a reduced perimeter segment of the fifth wheel type trailer hitch;
    a housing closure engageable with the housing, the housing closure including a slot closure tab attached to and extending from the housing closure, the slot closure tab engageable with the slot; and
    a locking device connected between the housing and the housing closure for restricting disengagement of the housing from the housing closure.

18. The trailer hitch security device of claim 17 wherein the housing closure further comprises a slot closure tab attached to and extending from the closure base, the slot closure tab engageable with the slot.

19. The trailer security device of claim 17 wherein the locking device further comprises a pin attached to the housing, the pin located and configured to pass through an aperture formed in the housing closure upon engaging the housing closure with the housing, the pin configured for engagement with a lock.

20. The trailer security device of claim 17 wherein the locking device further comprises a bolt assembly including a bolt slideably connected to the housing closure and configured to be selectively engageable with the housing and a lock engageable with the bolt.

21. A trailer hitch security device comprising:

a housing configured as an enclosure, the housing including a first face including a slot and a second face including an entry aperture, the slot including a width, the width greater than the cross-sectional width of a reduced perimeter segment of a gooseneck type trailer hitch device and, the width less than the cross-sectional width of an enlarged perimeter segment of the gooseneck type trailer hitch device, the housing configured to be placed over an enlarged perimeter segment of a gooseneck type trailer hitch and the slot configured to restrict passage of the enlarged perimeter segment from the housing when the slot is placed over a reduced perimeter segment of the gooseneck type trailer hitch;

a housing closure engageable with the housing; and a locking device connected between the housing and the housing closure for restricting disengagement of the housing from the housing closure.

22. A trailer hitch security device comprising:

a housing configured as an enclosure, the housing including a first face including a slot and a second face including an entry aperture, the slot includes a width, the width greater than the cross-sectional width of a reduced perimeter segment of a fifth wheel type trailer hitch device and, the width less than the cross-sectional width of an enlarged perimeter segment of the fifth wheel type trailer hitch device, the housing configured to be placed over an enlarged perimeter segment of a fifth wheel type trailer hitch and the slot configured to restrict passage of the enlarged perimeter segment from the housing when the slot is placed over a reduced perimeter segment of the fifth wheel type trailer hitch;

a housing closure engageable with the housing; and a locking device connected between the housing and the housing closure for restricting disengagement of the housing from the housing closure.

* * * * *